United States Patent [19]
Eirich et al.

[11] 3,956,446
[45] May 11, 1976

[54] METHOD OF FORMING DISCRETE PIECES OR PELLETS FROM MELTABLE GLASS-PRODUCING MIXTURES

[76] Inventors: Paul Eirich, Bahnhofstrasse 19; Walter Eirich, Bahnhofstr. 19; Hubert Eirich, Bahnhofstr. 19, all of Hardheim, Nordbaden, Germany; Piero Ercole, Via G. Roreto 10, Asti, Italy

[22] Filed: May 20, 1974

[21] Appl. No.: 471,584

[30] Foreign Application Priority Data
May 30, 1973 Switzerland............... 7862/73

[52] U.S. Cl................. 264/117; 65/27; 106/52; 106/84; 106/DIG. 8; 106/82
[51] Int. Cl.²............... B01J 2/16; C03C 1/02; C03C 3/04
[58] Field of Search............. 65/27; 106/52, DIG. 8; 264/117, 82

[56] References Cited
UNITED STATES PATENTS

| | | | |
|---|---|---|---|
| 3,350,213 | 10/1967 | Peyches........................ | 106/DIG. 8 |
| 3,503,790 | 3/1970 | Gringras........................ | 106/DIG. 8 |
| 3,573,887 | 4/1971 | Mod et al...................... | 106/DIG. 8 |
| 3,760,051 | 9/1973 | Eirich et al.................... | 264/117 |
| 3,782,906 | 1/1974 | Pierce.......................... | 264/117 |
| 3,846,143 | 11/1974 | Mod et al...................... | 106/DIG. 8 |

OTHER PUBLICATIONS
Hopkins, R. H., "How To Use Caustic Soda in Glass-"— Ceramic Industry, Nov. 1965, pp. 60–61, 106— DIG. 8.

*Primary Examiner*—Helen M. McCarthy
*Attorney, Agent, or Firm*—Toren, McGeady and Stanger

[57] ABSTRACT

In the disclosed method, granules or pellets are formed from meltable glass-producing mixtures which comprise sand and a sodium-containing component. The sodium-containing component consists at least partially of aqueous sodium hydroxide. The remainder of the sodium component may comprise sodium carbonate or other sodium salts or compounds. The glass-producing mixture may also contain other solid components customarily found in such mixtures. In accordance with the inventive method, the sand grains are treated with the aqueous sodium hydroxide at elevated temperature and without direct contact with $CO_2$, whereby a surface layer of water soluble silicates is formed on the sand grains. The sand is then mechanically treated in order at least partially to dislodge or remove the water soluble silicates from the sand grains. The remaining components or ingredients of the glass-producing mixture are then added whereupon, after mixing of the mixture to form a uniform mass, the mixture is agglomerated in the presence of 5–15 percent by weight of water. If necessary or desired, the discrete pellets thus formed are then dried.

28 Claims, 4 Drawing Figures

METHOD OF FORMING DISCRETE PIECES OR PELLETS FROM MELTABLE GLASS-PRODUCING MIXTURES

FIELD OF THE INVENTION

The invention is directed to meltable glass-producing mixtures and particularly to a procedure for forming small pieces, such as pellets or granules, from such mixtures.

BACKGROUND INFORMATION AND PRIOR ART

As is generally known in the glass producing art, it is desirable to supply the melting furnaces with homogeneous meltable glass mixtures. The homogeneity of the mixtures to be supplied to the furnaces is important since non-homogeneous mixtures cause serious melting problems. This is so because the ingredients which facilitate the melting process should be uniformly distributed throughout the mixture in order to avoid problems.

As is known, glass-producing mixtures have a tendency to de-mix or separate during transportation to the glass melting furnace. Several procedures have previously been suggested with a view to counteracting this de-mixing tendency of the mixtures. It has thus been proposed to shorten the distance between the location where the mixture is prepared and the furnace. Further, it has been attempted to moisten the glass-producing mixture. Experience has, however, demonstrated that these prior art methods do not significantly reduce the de-mixing tendency, particularly in respect of fine particles. It should also be considered that glass-producing mixtures which comprise fine particles have the disadvantage that the heating gases during the melting procedure in the furnace tend to carry along the fine particles which thus become entrained in the gases passing through the furnace. These particles then deposit on the brickwork of the furnace on which they have a strongly corroding effect. In order to avoid such a dusting in the furnace or melting vessel, the heat supply in the form of the heating gases has thus to be limited which in turn results in an output reduction of the melting furnace.

With a view to overcoming the problems caused by the de-mixing of the glass-producing mixture and the dusting in the furnace as referred to above, it has previously been suggested to form granules, pellets or briquets from the mixture prior to its entry into the melting furnace. Thus a number of granulating, pelletizing and briquetting procedures have been suggested for this purpose. It will be appreciated that glass-producing mixtures in piece or granule form—hereinafter sometimes referred to as discrete pellets—cannot readily de-mix during shipping and storage and moreover do not dust within the furnace. An additional advantage of such discrete pellets as distinguished from glass-producing mixtures in fine particle form is that the pellets have a greater density and thus permit improved heat transfer.

However in considering the above it has to be realized that customary glass-producing mixtures as they are used in the industry can only successfully be agglomerated into discrete pellets or granules if they contain a predetermined amount of fines, to wit very fine particles. For this reason and in order to form the desired discrete pellets it was first necessary to grind or comminute the ingredients of the mixture, particularly the sand, so as to obtain the necessary amount of fines. This in turn required considerable investment in respect of plant and apparatus and generally rendered the operating costs more expensive. The grinding, moreover, due to mechanical friction and abrasion action in respect of the walls of the grinding apparatus caused an undesired increase in the iron content of the glass-producing mixture. In order to avoid the comminution or grinding procedure, German Offenlegungsschrift No. 2,030,011 suggests to use a glass-producing mixture which contains caustic sodium hydroxide as the sodium component with at the most 15 percent by weight of water. The presence of this sodium hydroxide renders the mixture capable of agglomerization without prior grinding. However it will be realized that the shipping, storage and dosing of caustic soda melts of such high concentration causes considerable practical problems since such caustic sodium hydroxide melts are highly corrosive and have a solidification point above 180°C.

German Offenlegungsschrift No. 2,108,656 furthermore proposes to render glass-producing mixtures capable of granulation by adding market available sodium hydroxide solution of only 50 percent concentration and quicklime as the calcium component of the mixture. Granules or pellets obtained in this manner do not possess the disadvantages of glass-producing mixtures in fine particle form. The same applies to briquets formed from glass-producing mixtures with the aid of aqueous sodium hydroxide. However, such granules, pellets or briquets have in turn the disadvantage that the sodium hydroxide contained therein is hygroscopic. When the solid pieces, be they in granule, pellet or briquet form, are stored for prolonged periods of time, the hygroscopic nature of the sodium hydroxide causes disintegration of the solid pieces unless they are not subsequently treated with carbon dioxide so as to convert the sodium hydroxide into sodium carbonate. Such after-treatment with $CO_2$ results in storage-resistant solid pieces (granules, pellets or briquets). However during the subsequent melting in the glass-producing furnace, the carbon dioxide is again liberated from the sodium carbonate. This in turn requires refining of the glass melt with expensive refining agents. These refining agents, upon ultimate discharge from the furnace have a polluting effect on the ambient environment. Moreover the refining treatment with such agents results in annealing losses and negatively affects the heat passage through the solid pieces. These disadvantageous effects decrease the melting output of the furnace and result in increased expenditure in respect of operational efforts and energy.

In discussing the prior art, reference is also had to U.S. Pat. No. 3,542,534 which discloses a procedure wherein components of the glass-producing mixtures are first comminuted to form a fine particle mass which is thereafter granulated in the presence of sodium hydroxide whereafter the granulated mixture is subjected to a sintering procedure at a temperature of 200° to 700°C in order to impart the granules with sufficient stability. Such granules or solid pieces however do not result in any improved melting effect in the glass melting furnace since no eutectic mixtures with the sand are formed. Further also in this procedure, the aqueous sodium hydroxide is converted by the flue gases into sodium carbonate which, upon melting in the furnace, liberates carbon dioxide.

U.S. Pat. No. 3,503,790 discloses a procedure wherein an intermediate product for glass-producing batches in the form of a freely flowing powder is obtained. This powder is formed from sand particles which are partially coated with sodium metasilicate by heating the sand with individual sodium hydroxide particles of the same particle size order at temperatures of 300° to 450°C. However this procedure does not result in a glass-producing mixture in the form of discrete pieces or pellets so that this prior art procedure is not comparable with the inventive procedure. This prior art procedure does not solve the problem of demixing of the individual ingredients of the glass-producing mixture nor is it concerned with the dusting in the glass melting furnace.

In connection with the discussion of the prior art reference is also had to U.S. Pat. No. 3,760,051.

SUMMARY OF THE INVENTION

It is a primary object of the present invention to overcome the disadvantages and drawbacks of the prior art granulating, pelletizing and briquetting procedures as discussed above.

In particular it is an object of the present invention to form meltable glass-producing mixtures into a particulate mass of discrete pieces or pellets without it being necessary to subject the pieces or pellets to an after-treatment with carbon dioxide to obtain storage-resistant and mechanically relatively strong non-hygroscopic agglomerates which can be shipped and transported to the glass-producing furnace without disintegration or decomposition.

Another object of the present invention is to provide a procedure of the indicated kind wherein the glass-producing mixture is formed into granules, pellets or briquets which, during the melting procedure in the furnace, do not liberate any carbon dioxide at all or at least significantly lesser amounts of carbon dioxide than are liberated in the prior art procedures.

It is also an object of the present invention to provide pieces or pellets or the like solid bodies from glass-producing mixtures which during the melting in the glass-producing furnace result in lower annealing losses and an increased melting effect and output in the furnace.

Generally it is an object of the present invention to provide a procedure of the indicated kind which leads to significant savings in energy and reduction of the required melting furnace capacity.

Briefly and in accordance with the invention the above objects are obtained by using a glass-producing mass which comprises sand and a sodium component which at least partially consists of aqueous sodium hydroxide with the remainder of the sodium component comprising sodium carbonate or other sodium salts or components. The glass-producing mixture to be subjected to the compounds. inventive procedure may also contain other solid components customarily used in such mixtures. In accordance with the inventive procedure the sand particles of the mixture are treated at elevated temperature with aqueous sodium hydroxide without direct contact with $CO_2$ to form a surface layer of water soluble silicates on the individual sand particles. The sand is then mechanically treated so as at least partially to dislodge or remove the water soluble silicates from the sand particles. The remaining or additional ingredients of the glass-producing mixture are then added whereupon, after mixing the mixture to form a uniform mass, the mass is agglomerated in the presence of 5 to 15 percent by weight of water. The resulting granules or pellets are thereafter dried if this is deemed necessary or desirable.

According to one embodiment of the invention the partial conversion of the sand particles with the aqueous sodium hydroxide to form the water soluble silicate surface layer can be performed as a first step or stage in a continuous procedure with the subsequent process steps or stages in a single plant or arrangement. However, according to a second embodiment of the invention, it is also feasible to effect the sand treatment with the aqueous sodium hydroxide as a totally separate step from the remaining procedure. Thus the treatment of the sand can be effected directly in the sand quarries and the thus treated sand can then be shipped to a different location where the subsequent mechanical treatment for the removal of the water soluble silicate layers and the subsequent granulation take place. Thus the mechanical treatment of the previously treated sand particles and the granulation may be effected in the glass-producing plant or in a unit separate but adjacent the glass-producing plant while, as stated, the initial treatment of the sand with the aqueous sodium hydroxide may be effected in the sand quarries.

It should be appreciated that the individual components or ingredients which make up the glass-producing mixture to be treated in accordance with the inventive procedure are customary components used in such mixtures. The sole condition which has to be met is that the sodium-containing component of the glass-producing mixture must at least partially consist of aqueous sodium hydroxide although it is at least theoretically feasible that the entire sodium-containing component consist of aqueous sodium hydroxide. It will be appreciated by those skilled in this art that the inventive procedure can be successfully carried out if the sodium-containing component of the glass-producing mixture comprises partially sodium carbonate or other sodium salts or compounds, provided that a sufficient amount of aqueous sodium hydroxide to convert the sand particles in the indicated manner is present. However in the most preferred embodiment of the invention, the entire sodium-containing component of the glass-producing mixture consists of aqueous sodium hydroxide. This is so because in the latter case and during the smelting in the glass-producing furnace only insignificant amounts of carbon dioxide will be liberated. In the event that the glass-producing mixture contains a calcium component, the latter may, in customary manner consist of calcium carbonate (limestone) or dolomite. However in the most preferred embodiment of the invention, the calcium-containing component, if it is present at all, consists at least partially of quicklime for reasons which will become apparent from the following description.

The other solid ingredients which may be contained in the glass-producing mixture are also of customary nature and are for example feldspar, naturally occurring silicates, lead silicate, alumina, borax or boric acid, lithium-containing minerals, lithium carbonate, potash, magnesite, barium carbonate and zinc oxide. However it should be appreciated that the presence of these and other ingredients is not critical for successfully carrying out the inventive procedure, the crux being the initial presence of sand and sodium hydroxide in the mixture.

The sand and the aqueous sodium hydroxide are usually employed in the first process step, to wit the step in which the sand is treated with the aqueous sodium hydroxide, in quantities which correspond to the desired ratio of $SiO_2:Na_2O$ in the final glass-producing mixture. However it is also within the scope of this invention to use a lesser amount of one of the two ingredients or reaction partners and to add the remainder of the respective components subsequently together with the other ingredients or components to be contained in the ultimate glass-producing mixture. Such latter procedure is for example recommended if the sodium-containing component of the glass-producing mixture only partly consists of aqueous sodium hydroxide since then the rest of the sodium-containing component, to wit e.g. the sodium carbonate is added to the mixture after the initial treatment of the sand with the sodium hydroxide.

In the first process step, the sand and the aqueous sodium hydroxide are heated for a sufficiently long time and at a sufficiently high temperature so that the exterior strata of the individual sand particles or grains react with the sodium hydroxide to form the desired water soluble silicates such as for example sodium metasilicate and sodium disilicate without however resulting in complete dissolution of the sand grains or particles. For this purpose the heating temperature should usually be between 200° and 450°C, preferably between 250° to 450°C. A particularly preferred temperature range is between 300° and 400°C and still more particularly between 350° and 400°C. Experiments have indicated that the best results are obtained if the heating is effected at between about 350° to 380°C.

In respect of the time period during which the sand grains or particles are subjected to the treatment with the aqueous sodium hydroxide, it has been established that normally a treatment period of about five minutes to two hours, preferably about five minutes to 60 minutes gives satisfactory results. Experiments have shown that treatment times of 10 to 30 minutes and generally of about 15 minutes are sufficient.

The sodium hydroxide solution may be in diluted or strongly concentrated form. However the most preferred sodium hydroxide concentration is about between 30 to 75 percent, excellent results being obtained with sodium hydroxide solution of about 50 percent concentration. Since the latter product is generally available on the market—commercial sodium hydroxide solutions are usually sold in 50 percent concentration—the latter product is particularly recommended.

In carrying out the treatment of the sand grains with the sodium hydroxide solution, it is feasible first to heat the sand to a temperature which is above the reaction temperature. For example the sand may be heated to a temperature of about 600° to 900°C whereafter the sodium hydroxide solution is added to the hot sand whereby the desired partial conversion of the surface strata of the sand grains takes place without having to supply additional heat during the reaction.

The product of this first process step thus consists of sand grains or particles which have a smaller diameter than the original ones, the grains comprising a surface layer of water soluble sodium silicates such as sodium metasilicate and sodium disilicate. This silicate layer can readily be dislodged or removed from the sand grains or particles by mechanical treatment, such as for example by the subsequent mixing with the other components and ingredients of the glass-producing mixture. Such mixing may be effected in an intensive action mixer.

The mechanical dislodgement of the silicates from the sand grains results in the formation of a silicate powder in fine particle form with the remaining cores of the sand grains forming a quartz sand component in fine particle form. The formation of this silicate powder and the quartz sand component, both in find particle form, is beneficial for the agglomeration capability of the glass-producing mixture. Further the water soluble sodium silicates which have been dislodged from the sand grains constitute a binder for the remaining components of the glass-producing mixture and thus further beneficially contribute to the agglomeration capability of the mixture. Finally it should be observed that the obtained mixtures of quartz sand and sodium metasilicate and/or sodium disilicate constitute eutectic mixtures which lower the melting temperature of the glass-producing mixture and thus increase the melting properties of the mixture and the melting effect of the glass melting furnace.

In the usual case the inventive procedure is carried out in batchwise manner. Pursuant to preferred embodiments and after reaction of a batch of sand with aqueous sodium hydroxide, only a portion of the reaction product of this batch is directly further processed while the remaining portion of the reaction product, preferably about 20 to 70 percent by weight of the batch, is recycled to a subsequent or another batch. The reason for this procedure is the following: it is advantageous that the amount of sodium hydroxide which is added to the sand does not exceed the amount which can be absorbed by the sand without sedimentation or phase separation. This amount is generally about 5 to 25 percent by weight calculated on the weight of the sand. However in many instances and depending on the ultimately desired composition of the glass-producing mixture, relatively large amounts of sodium hydroxide have to be added to the sand. The same applies when relatively diluted sodium hydroxide solution is to be used. In such instances it is not sufficient to supply 5 to 25 percent by weight of sodium hydroxide to the sand. In those instances it is therefore necessary to recycle a portion of the reaction mixture to a subsequent batch of sand and sodium hydroxide solution. In this manner a phase separation of the starting mixture is prevented. Advantageously an amount of reaction product of the preceding batch is recycled to the subsequent batch, where the recycled portion is admixed with additional sand and sodium hydroxide solution, so that this subsequent batch absorbs the total amount of sodium hydroxide which is necessary for obtaining the ultimate composition of the glass-producing mixture in respect of the ratio of $SiO_2:Na_2O$ without there occurring sedimentation of the solid components. The reaction mixture which is thus formed in this subsequent batch to which a portion of the reaction mixture of the proceding batch has been recycled, is ther again divided into two portions, one being directly further processed and the other one again being recycled to the then following batch of sand and sodium hydroxide. As stated, generally 20 to 70 percent by weight of the reaction mixture sand-sodium hydroxide is recycled to the subsequent batches. If the operation of the plant is constant, the amount of reaction product of each batch which is recycled to the subsequent batch will also remain constant. The amount of solid components in the mixing can be still further increased by supplying the filter dust which collects in the entire plant to the mixing means.

By proceeding in the above indicated manner, the first process step of the invention results in a reaction mixture which is more readily handled than a reaction product which would separate into a solid and a liquid phase by sedimentation. The heat of the recycled portion of the reaction product has the tendency to cause partial evaporation of the water contained in the aqueous sodium hydroxide. If no actual evaporation of the water takes place, then of course the heat at least preheats the sand-sodium hydroxide mixture so that the heat is fully utilized.

In some instances it is advantageous to separate the reaction mixture of the first step into a coarse fraction and a fine fraction and to recycle the coarse fraction to the subsequent batch. In this manner the amount of fines and thus the agglomeration capability of the glass-producing mixture is significantly increased. The separation of the coarse fraction and the fine fraction may be effected for example by pneumatic suction. The procedure may then be effected in such a manner that the amount of coarse fraction to be recycled to the next batch is so large that, upon admixture of a corresponding amount of sand and sodium hydroxide, as is necessary for obtaining the desired final composition of the glass-producing mixture, no sedimentation or phase separation takes place in this subsequent batch. It is particularly advantageous in such cases to effect the separation into coarse fraction and fine fraction, e.g. by pneumatic suction, in the same device in which the mechanical treatment of the sand grains is performed for the purpose of dislodging the sodium silicates from the sand grain surfaces. This can for example be carried out in an intensive action mixer, particularly in a counter flow mixer whose mixing energy introduction is above 3kW/100 kg of the mixture, preferably between 5 and 15 kW/100 kg.

If the excess of liquid introduced into the reaction mixture of the first process step by the addition of the sodium hydroxide solution is relatively small, it is possible to evaporate a portion of the water during the premixing of the sand with the sodium hydroxide solution prior to the chemical reaction between the sand and the sodium hydroxide. This is accomplished by preheating the sand before the sodium hydroxide solution is added. The preheating can be effected by a portion of the flue gases of the glass melting plant.

If it is intended to incorporate aluminum components into the glass-producing mixture in the form of alumina such as calcined alumina or alumina hydrate, it is then advantageous to do so during this first process step in which the sand is reacted with the sodium hydroxide since the alumina will then also react with the sodium hydroxide to form sodium aluminate.

Turning now to the removal of the water soluble sodium silicates from the sand grain surfaces, it is noted that this can be effected by recycling the reaction product of sand-sodium hydroxide into the premixer in which the sand and the sodium hydroxide have originally been mixed. At least a portion of the product obtained in the premixer is then supplied to the further processing. However the at least partial removal of the water soluble silicates from the sand grains can also be effected in an after-mixer without recycling. The first mentioned alternative is preferred in plants of small output while the second alternative is recommended for larger plants.

The removal of the sodium silicate layer from the treated sand grains may be effected in a separate process step or can be performed simultaneously with the subsequent mixing of the sand-sodium hydroxide reaction product with the remaining ingredients of the mixture to form a uniform glass-producing mixture. In this case the mixing will cause removal of the water soluble sodium silicates from the sand grain surfaces. Further as has already been stated above and if the reaction product obtained in the first process step is separated into a coarse fraction and a fine fraction, the removal of the sodium silicates from the grain surfaces can be effected simultaneously with this separation. In each instance and either prior or after the removal of the water soluble silicates from the sand grains, the remaining ingredients of the mixture necessary for obtaining the ultimately desired composition of the glass-producing mixture are added in the required amounts to the reaction mixture obtained from the first process step. The mixture which thus contains all the ingredients is then subjected to mixing for obtaining a uniform mass of great homogeneity. It is advantageous to supply the reaction product obtained in the first process step to the mixing step with the other ingredients in still relatively hot condition. For this purpose the mixing with the remaining ingredients is preferably effected immediately after the first process step has been terminated or the reaction product from the first process step is stored in a heat insulated intermediate or storage container until the further processing, to wit the mixing with the additional ingredients, takes place.

If the mechanical processing of the reaction product obtained in the first process step is effected in an after-mixer, this processing can then be carried out selectively in that the reaction product from the first process step, to wit the product obtained after the reaction of the sand with the sodium hydroxide, is first worked in an intensive action mixture at increased velocity, to wit with increased energy introduction whereupon subsequently the remaining ingredients of the mixture are admixed with a lesser energy introduction in the same device.

During or after the mixing of the total glass-producing mixture to obtain the uniform mass, the mass or mixture is moistened in order to dissolve the sodium metasilicate and thus to render it active as binder for the subsequent agglomeration. The heat which has been introduced into the system from the first process step contributes to the more rapid dissolution of the sodium metasilicate. Since the sodium disilicate is more difficultly soluble than the sodium metasilicate, it forms a portion of the fine which are required and desirable for the agglomeration. The moistening of the mixture is effected in such a manner that it has a water content of about 5 to 15 percent by weight, calculated on the total mixture, during the subsequent agglomeration. The total amount of the water can be added to the mixture during the mixing to obtain the uniform mass or the water may be added during the agglomeration procedure proper. Generally, it has been proved to be advantageous to add about 20 percent of the amount of water during the mixing while the remainder of the water is added prior to the agglomeration. For the purpose of further utilizing the heat, the steam which has escaped from the reaction of the first process step can be used for the moistening purpose. It is also possible to use steam which has been produced with the aid of the flue gases of the plant.

As previously set forth, the amount of fines to wit the moiety of fine particles in the glass-producing mixture, and thus the agglomeration capability of the mixture, can be still further increased by adding to the glass-producing mixture a calcium-containing component which partially or totally is in the form of quicklime. The quicklime reacts with the water in the mixture under the formation of calcium hydroxide of very fine particle size. The amount of heat which is formed in this manner can also serve the purpose to accelerate the dissolution of the sodium metasilicate which has been dislodged from the sand grains. The increase in the amount of fines by adding quicklime to the mixture is particularly of importance if relatively small amounts of sodium hydroxide solution are added in the procedure so that the amount of sodium metasilicate and sodium disilicate is relatively small.

After the glass-producing mixture has been thoroughly and uniformly agitated or mixed to obtain a mass of great homogeneity, the next process step takes place, to wit the agglomeration proper. In this context it should be emphasized that the term "agglomeration" as used herein is deemed to refer to any method or procedure which results in the formation of pieces such as granules, pellets, briquets and the like. If actual briquets are to be formed, the mixed glass-producing mass can be introduced into molds of predetermined shape under compacting and densification. However it is preferred if the inventive procedure is carried out to form granules or pellets. The agglomeration or granulation may be effected in the same device in which the mixing to obtain the uniform mass is performed. This device is advantageously an intensive action mixer and particularly a counter flow mixer producing the mixing energy values referred to above. For this purpose and after the mixing to obtain the uniform mass, the mixing energy is simply reduced in such a manner that granules or pellets form in the intensive action mixer. However it is also possible to equip the intensive action mixer which is used for the mixing of the glass-producing mass with mixing tools such as a granulating disc or pan or a granulating drum. Any kind of rapidly rotating mixing tools fitted into intensive action mixers may be used for this purpose. The moistened mass or mixture is then conveyed from the mixing device is ungranulated manner to the intensive action mixer with the rotating mixing tools, the granulating then taking place in this intensive action mixer. Mixers having granulation pans are of particular advantage since then the diameter of the granules or pellets to be produced can be readily adjusted and controlled. It should also be mentioned that it is possible to effect a pregranulation in a mixing device such as an intensive mixer and that, after the pregranulation, a final or after-granulation is effected in the subsequent granulation pan or granulation drum.

If the water is added during the granulation procedure, it is recommended that the temperature of the ingredients of the mixture should be slightly higher than the ambient temperature and should preferably be about 40°C.

In some instances it is sufficient to supply the granules or pellets thus obtained to the glass melting furnace without prior drying, particularly if the pellets or granules are formed in the same plant in which the melting procedure takes place. However preferably the agglomeration procedure is followed by a drying of the pellets or granules, the drying being effected so that the ultimate water content of the solid pieces does not exceed about 5 percent by weight. The drying procedure can conceivably also be carried out during the agglomeration procedure. The heat of the glass-producing mixture which is still available from the first process step, to wit the reaction of the sand with the sodium hydroxide solution and/or from the reaction of the quicklime with the water of the mixture may be used for this purpose. Further the drying can be effected additionally or exclusively with the flue gases from the glass melting plant.

The drying can be carried out in customary devices of this nature as for example drum or belt driers. It is also feasible to effect the combined granulation and drying such as suggested in German Offenlegungsschrift No. 2,132,680 which discloses suitable equipment for this purpose.

In some instances the granulation can be effected in a so-called stepped dish or pan wherein the drying of the pellets or granules is effected at the outer rim of the stepped pan by means of a burner or with the flue gases emanating from the glass melting plant.

The inventive procedure results in the formation of elastic and compact agglomerates, to wit pellets, granules or the like pieces which can be shipped and transported and further processed without damage or disintegration. By controlling the rotary speed, the inclination and the charging of the granulating means, the size of the granules or pellets can be optimally adjusted. Generally it is possible to obtain pellets of substantially spherical form. Upon further processing the granules or pellets, customary conveying devices and drying arrangements can thus be used without there being a danger that the agglomerates be damaged or destroyed. The solid pieces can thus be conveyed not only with mechanical conveying means but also in pneumatic manner which renders the conveying procedure less expensive.

The agglomerates obtained in accordance with the invention are free from salts and bases which could react with carbon dioxide so that the drying can be effected in economic and simple manner by means of carbon dioxide-containing flue gases. The agglomerates are moreover substantially devoid of hygroscopic substances such as sodium hydroxide so that, without subsequent carbon dioxide treatment, extremely hard and friction-resistant granules or pellets are obtained which do not exhibit any crack formation. In this context it should be appreciated that in the prior art generally granules are obtained which are subject to crack formation. This is so since in the prior art with simultaneous drying and carbon dioxide treatment, sodium hydroxide-containing granules, due to the escaping of steam through the solidifying outer skin do not exhibit a smooth surface but are cracked. Due to this increased compactness and the lack of cracks, the inventive granules or pellets exhibit improved heat transfer and passage of heat and thus increased melting effect of the glass melting furnace is achieved.

The inventive agglomerates are substantially insensitive in respect of air moisture and thus can be stored for indefinite periods of time. Either they are completely free from sodium carbonate or the sodium carbonate content is exceedingly low which on the one hand improves the heat transfer in the melt since only insignificant amounts of $CO_2$ are liberated and on the other hand facilitates the refining with the aid of customary expensive and polluting refining agents. This again increases the effect and output of the glass melting furnace. The reduced carbonate content moreover results in an annealing loss which is considerably lower than that with the prior art granules so that the capacity of the glass melting furnace and the energy expenditure for melting purposes can be significantly reduced. Generally and customarily, the annealing loss in the inventive granules is only about 6 percent as compared with the 13 to 15 percent of granules of the same glass composition but produced in accordance with prior art procedures.

The absence of sodium hydroxide and the complete absence of sodium carbonate—provided the sodium-containing component is devoid of sodium carbonate—as well as the complete absence of dust, significantly reduces the chemical attack on the refractory brickwork of the glass melting furnace. This chemical attack was a significant factor in the relatively short life of the brickwork of glass melting furnaces operated with prior art glass-producing mixtures. The relatively large content of fines of the glass-producing mixture results in a very satisfactory homogeneity of the agglomerate. As a matter of fact, tests have indicated that the chemical composition of pellets or granules which were tested over a long period of time and which were sampled at different time periods was substantially constant and no significant deviation could be detected.

All these advantages have a cumulative effect which results in a significant increase of the melting capacity. Thus the melting capacity or effect increases in many instances by 40 percent as compared to prior art glass-producing mixtures. These results were obtained in the production of green, yellow, semi-white and white glass in continuous melting plants for industrial production purposes. By using agglomerates produced in accordance with the inventive procedure it is thus possible substantially to increase the heat effect of the glass melting furnace without causing simultaneous destruction of the regeneration chambers or the refractory linings or brickwork of the furnace.

The inventive procedure is very flexible and hard granules or pellets can be obtained even if only a portion, for example 40 percent of the required sodium-containing component of the mixture is supplied in the form of sodium hydroxide solution while the remainder of the sodium-containing component is in the form of other sodium compounds such as sodium carbonate.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
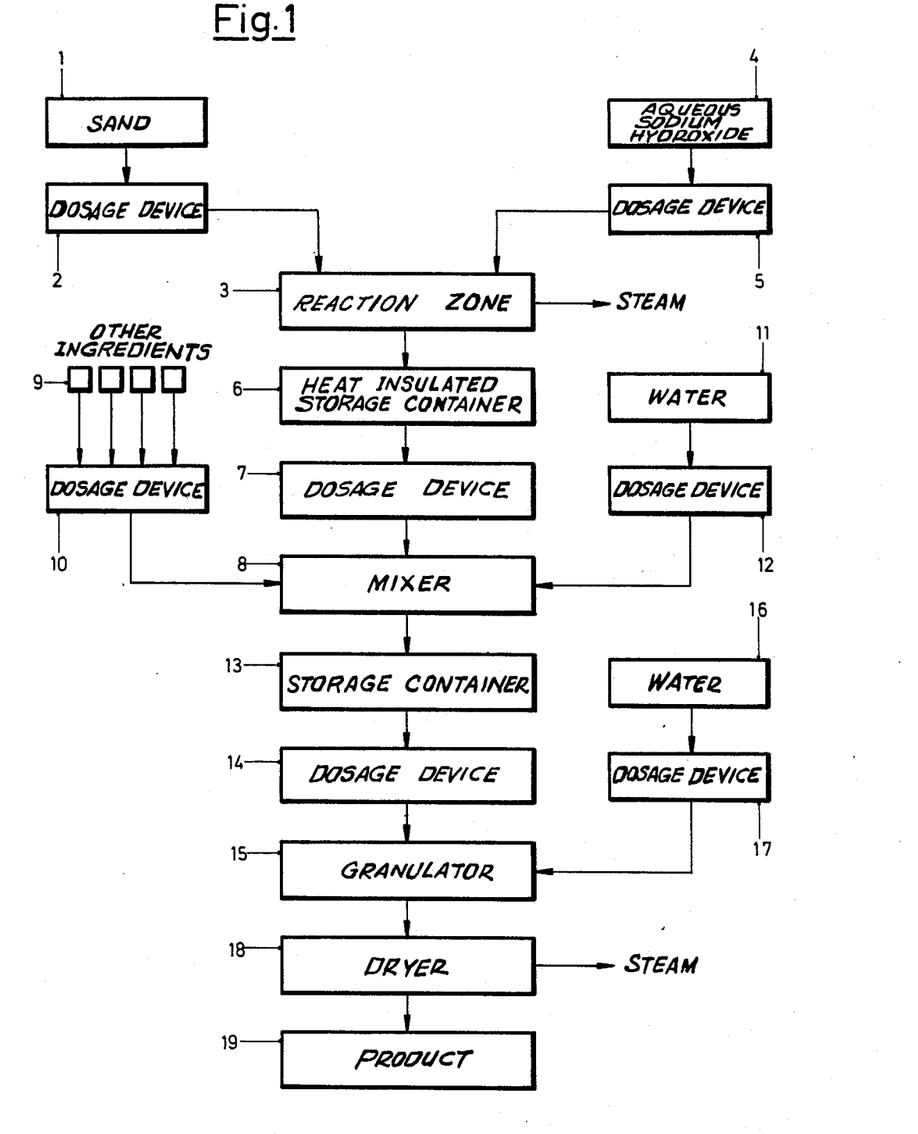
FIGS. 1, 2, 3 and 4 are respectively flow sheets, diagramatically indicating four embodiments for carrying out the inventive procedure.

Turning first to the procedure indicated in the flow sheet of FIG. 1, it will be noted that sand is fed from the supply container 1 and in the desired amount through the volumetric dosage arrangement 2 into the reaction zone 3 in which the thermal reaction with the sodium hydroxide solution takes place. For this purpose, sodium hydroxide solution of 50 percent concentration is conveyed from the storage container 4 through the dosage device 5 into the reaction zone 3. In the reaction zone 3 the sand and the sodium hydroxide solution are reacted in the presence of heat whereupon the reaction product or mixture thus obtained is conveyed into the heat insulated storage container 6 where the reaction product is stored until further processing.

From the heat insulated storage container 6, the reaction mixture is conveyed through the dosage arrangement 7, which dispenses in accordance with weight units, into the mixing device 8. The mixing device 8 is also supplied by the storage containers 9 (four being shown) which contain the other ingredients of the glass-producing mixture to be prepared. A weight dosage device 10 is interposed between the storage containers 9 and the mixing arrangement 8 so that the ingredients emanating from the containers 9 have to pass through the dosage arrangement 10. Water reaches the mixer 8 from the receptacle 11 after having passed through the dosage arrangement 12 which dispenses the required amount into the mixer 8. The components supplied to the mixer 8 are uniformly mixed in the mixer from where they reach the storage container 13. From the storage container 13 the mixture thus obtained is supplied through the continuously operating volumetric dosage arrangement 14 to the granulating device 15. Water simultaneously flows from the storage container 16 through the dosage device 17 into the granulating arrangement 15. The granules or pellets formed in the granulator 15 are then conveyed to the drier 18. Steam is liberated in the drier 18 and the finished pellets or granules are indicated by 19. It will be noted that steam is also liberated in the reaction zone 3, the steam being formed from the water in the sodium hydroxide solution. In this embodiment the water soluble sodium silicates which are formed on the sand grains in the treatment zone 3 are at least partially removed in the mixer 8 during the mixing with the additional components supplied from the containers 9.

Figure 2:
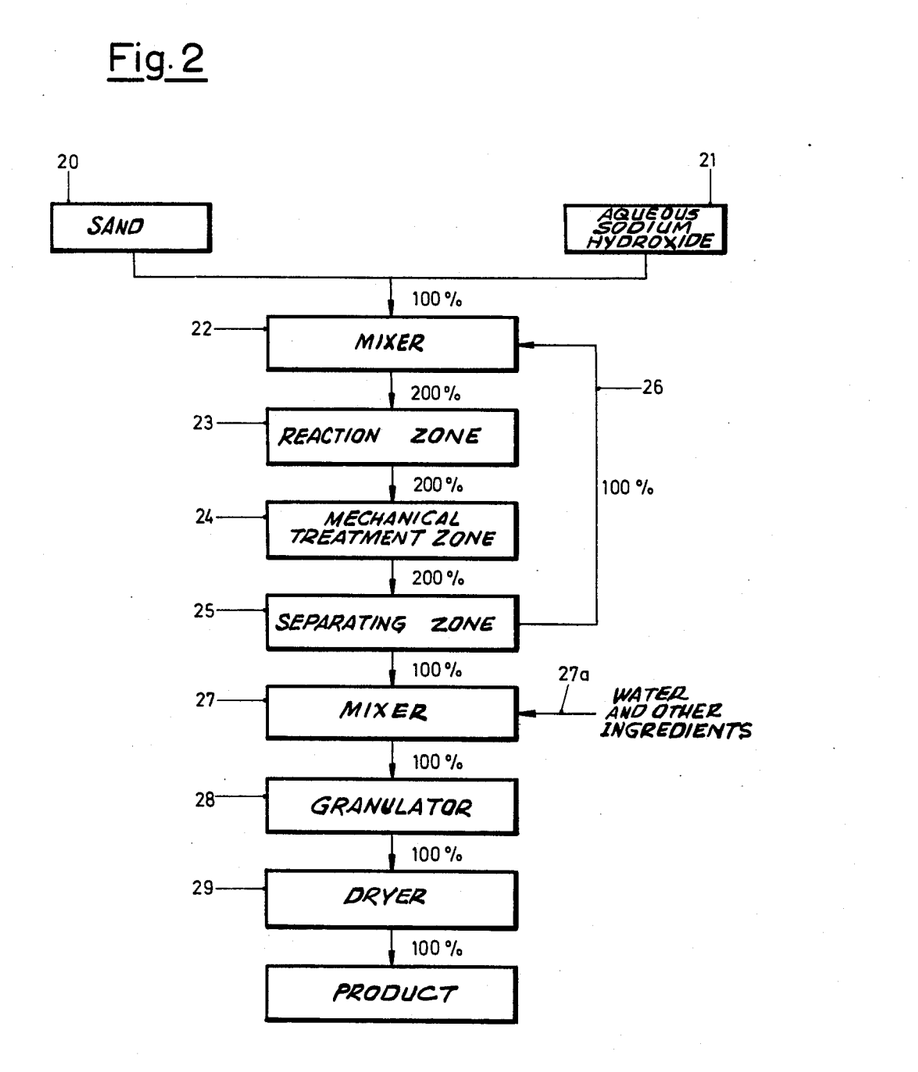

Turning now to the embodiment of FIG. 2, it will be noted that a modification of the general procedure of FIG. 1 is illustrated therein which in fact constitutes a preferred embodiment of the inventive procedure. It should also be noted that, in the same manner as in FIGS. 3 and 4, the dosage devices which have been diagramatically indicated in FIG. 1, have been eliminated in this Figure for the purpose of not crowding the drawing. Sand is withdrawn from the receptacle 20 and supplied to the mixing arrangement 22. Sodium hydroxide solution in turn flows from the receptacle 21 into the mixing device 22. Reaction product from a preceding batch which has collected in the separating zone 25 is conveyed into the mixing arrangement 22 through conduit 26 as indicated in FIG. 2. The amount of reaction mixture, to wit sodium hydroxide solution and sand which is supplied to the mixing zone 22 through conduit 26 is substantially the same amount which is supplied from the receptacles 20 and 21. This is indicated by the values "100 percent" and "200 percent" as shown in FIG. 2. The reaction product supplied to the mixer 22 through conduit 26 is intimately mixed with the sand and the sodium hydroxide flowing into the mixer 22 from receptacles 20 and 21. The mixture thus obtained flows then from the mixing device 22 into the reaction zone 23 where the reaction between the sand and the sodium hydroxide takes place at elevated temperature. The units 22 and 23 and the phenomena occurring therein thus constitute the first process step as previously referred to. The reaction product obtained in the reaction zone 23 is supplied to the mechanical processing zone 24 in which, by means of mechanical treatment, the sodium silicates which have been formed as surface layers on the sand grains are at least partially removed from the remaining sand grain cores. The mechanical treatment may be in different forms. For example it may be in the form of subjecting the sand grains to the action of a rolling mechanism. The reaction mixture obtained in unit 24 is conveyed to the separating zone 25 where the reaction mixture is separated into two components. One of the components is the one which is recycled through conduit 26 to the mixing device 22 as previously indicated, while the other component or fraction is conveyed to the mixing device 27. The mixing device 27 in turn is supplied with the remaining ingredients of the mixture through conduit 27a which also supplies the mixer 27 with water for the purpose of moistening the mixture obtained in the unit 27. After thorough mixing of the ingredients in the mixer 27 to form a uniform mass, the mass is conveyed to the granulator 28 where granulation into pellets or granules takes place. The granules or pellets are then conveyed into the drier 29 and the final dried pellets or granules which have a moisture content of not more than five percent are thus obtained.

Considering the amount of water which is liberated during the procedure, the amount of pellets or granules which are discharged from the drier 29 corresponds to the amount of sand and sodium hydroxide respectively supplied from the storage containers 20 and 21, provided the procedure as shown in FIG. 2 is operated continuously. Mixing device 22, the reaction zone 23, the mechanical treatment zone 24 and the separating device 25 possess however twice the capacity since they additionally have to accommodate the respective recycling from the separating device.

Figure 3:
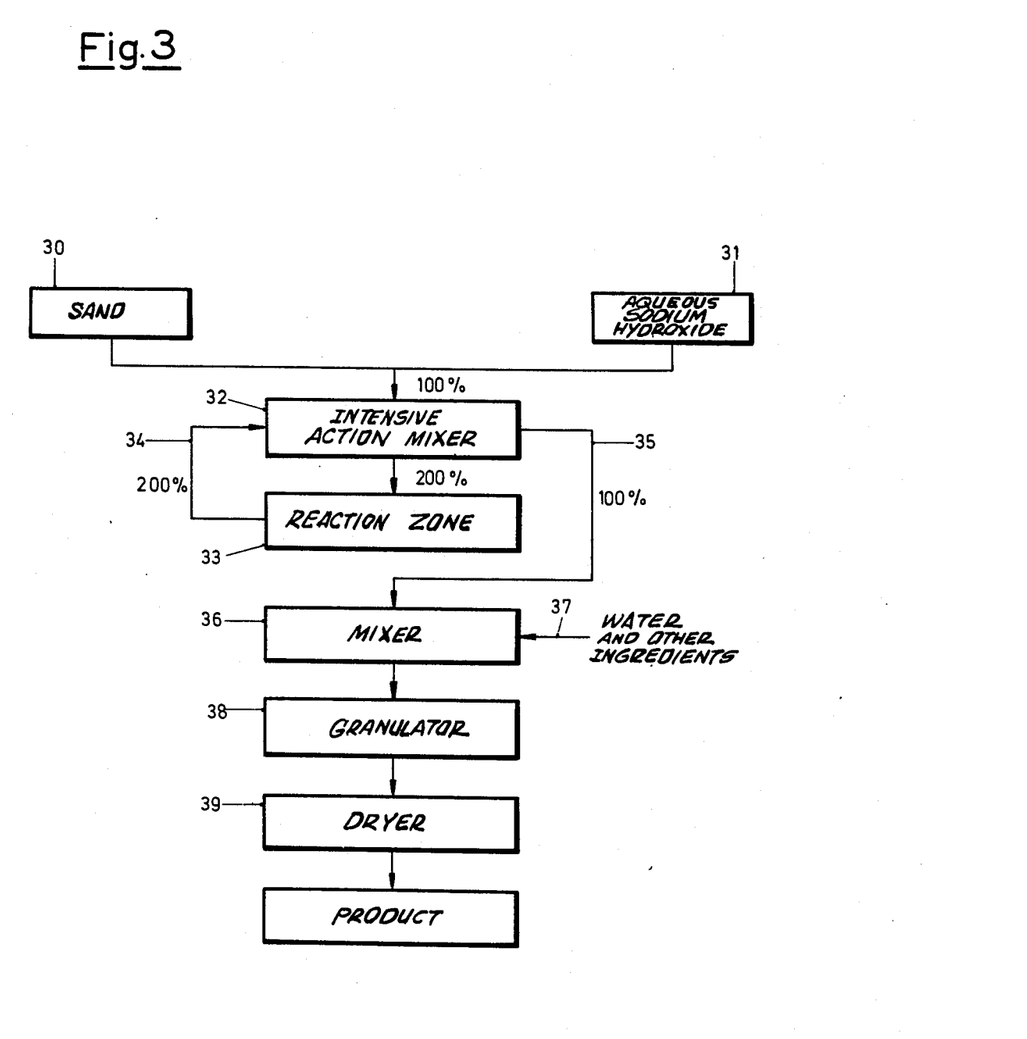

FIG. 3 is a diagramatic representation of still another embodiment of the inventive procedure. Pursuant to the flow sheet as shown in FIG. 3, the sand and sodium hydroxide solution are supplied from the storage containers 30 and 31, respectively, and enter the intensive action mixer 32. The sand and the sodium hydroxide solution are thoroughly mixed in the intensive action mixer 32 with the coarse fraction of a preceding batch. To this end the reaction product from the preceding batch is recycled from reaction zone 33 and through line 34 into the intensive action mixer 32. It will be noted that the amount of recycled material originally is twice as much as the amount of sand and sodium hydroxide which is supplied to the mixer 32 from receptacles 30 and 31. However, a pneumatic suction device is operatively connected (not shown) to the mixer 32. The reaction product which has been recycled from the reaction zone 33 through line 34 and after mechanical treatment in the mixer 32 to dislodge silicates from the sand grains is separated by the pneumatic suction device into a coarse fraction and a fine fraction. The coarse fraction remains in the mixer 32 where it is intimately mixed with the fresh sand fresh sodium hydroxide solution supplied from the units 30 and 31. By contrast the fine fraction is transferred through line 35 to the mixer 36 as indicated in FIG. 2. The remaining components of the glass-producing mixture as well as moistening water are also supplied to the mixer 36 as indicated by the supply conduit 37. After mixing in the mixer 36 to obtain a uniform homogeneous mass, the mass is supplied to the granulating device 38 where the pellets or granules formed are discharged and transferred into the drier 39. As is clear from the values indicated in the flow sheet, the amount of reaction product recycled to the intensive action mixer is twice as large as the amount of sand and sodium hydroxide which is supplied through the units 30 and 31. However since half of the amount (the fine portion) of the recycled portion is again removed from the mixer 32 to be transferred to the mixer 36, the amount of material which is conveyed from the mixer 32 to the reaction zone 33 is twice the amount of material supplied to the mixer 32 from the units 30 and 31. It will be noted that the amount of granules or pellets which are obtained in the drier 39, and considering the amount of water liberated during the procedure, corresponds to the combined amounts of sand and sodium hydroxide which are supplied from the supply containers 30 and 31. In the embodiment here discussed, merely the mixer 32 and the reaction zone 33 have to have twice the capacity in order to be able to absorb and accommodate the recycled quantities. The mechanical treatment in order to remove the silicates from the sand grain cores is effected in this embodiment in the mixer 32 which, as stated, is preferably an intensive action mixer.

By suitably controlling the first process step, to wit the reaction of the sand with the sodium hydroxide, reduction in the mesh size of the sand particles is obtained which in turn increases the amount of fines in the ultimate mixture, thereby at the same time providing a suitable binder for the granulating procedure. Further and parallel thereto, significant melting technical advantages are obtained due to the formation of an eutecticum. The heat which is carried along from the first process step facilitates, in the second step a rapid and effective dissolution of the binder and a rapid solidification of the formed granules or pellets. The presence of the melting technically favorable mixture in granulated form permits a full utilization of the melting technical advantages.

Figure 4:
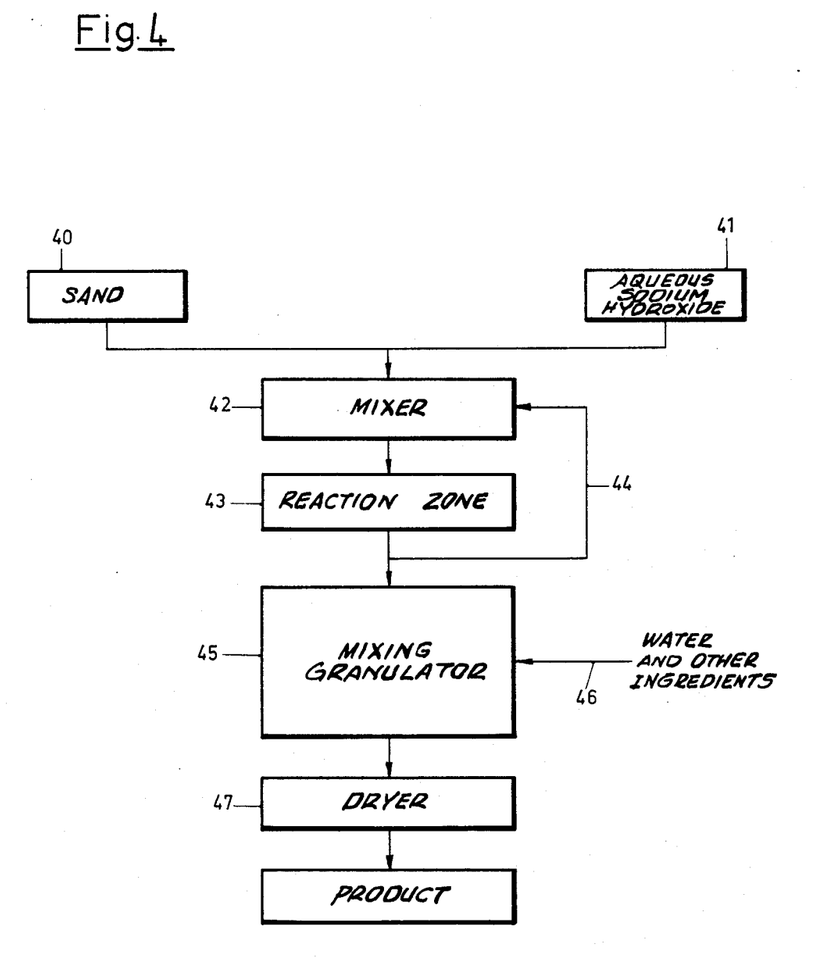

Finally FIG. 4 illustrates a still further embodiment of the inventive procedure. This embodiment simplifies significantly the apparatus expenditure. The sand is supplied from the supply container 40 while the sodium hydroxide solution flows from the container 41, the sand and the sodium hydroxide solution entering the mixer 42. After a premixing in the mixer 42, the mixture is conveyed to the reaction zone 43 where the thermal reaction between sand and sodium hydroxide takes place. The reaction product thus obtained is divided, one portion, for example about 50 percent, being recycled through line 44 to the premixer 42 while the remainder, to wit the other 50 percent of the reaction product is conveyed to the mixing granulator 45. The mixing granulator is in the form of an intensive action mixer and serves three functions. First, due to high energy output of the mixer, the reaction product obtained from the reaction zone 43 is mechanically worked to dislodge the sodium silicates from the sand grain surface. Second, at a lesser energy output, the reaction product is thoroughly mixed with water and the remaining ingredients of the mixture which are supplied to the mixing granulator through the conduit 46. Finally the granulation takes place in the mixing granulator, which may be effected at still lesser energy output. In other words the removal of the sodium silicates from the sand grains, the mixing of all the components of the glass-producing mixture into a homogeneous mass and the granulation are all performed in the same unit. The granules or pellets are then conveyed to the drier 47 where the ultimate product is obtained.

Instead of employing a unit such as the unit 45 in FIG. 4, to wit a unit which performs all three functions mentioned above, the procedure can be modified to such an extent that the reaction product emanating from the reaction zone 43 and after recycling of a portion thereof through line 44, is initially supplied to an intensive action mixer which operates in two phases. In the first phase and under high energy output, the mechanical working of the reaction product obtained from reaction zone 43 is effected in order to remove the water soluble silicates. By contrast in the second subsequent phase and with a lesser energy output, the admixing of the water and the remaining ingredients of the mixture is accomplished in the intensive action mixer. In this latter embodiment, and after a homogeneous mixture has been obtained, the homogeneous mixture is then transferred into a separated granulator for granulation purposes. Another variation or modification of the inventive procedure resides in that the reaction product after recycling of a portion thereof is supplied to an intensive action mixer in which merely the mechanical treatment for removing the sodium silicate is effected at high energy output whereupon the mixture is supplied to a mixing granulator. In the mixing granulator the mixing with the water and the other ingredients of the glass-producing mixture is effected whereupon finally the granulation is performed in the same device.

Irrespective of which variation according to the procedure of FIG. 4 is adopted, the granules or pellets which are discharged from the mixing granulator or the intensive action mixer are supplied to the drier or drying unit 47 from where they are discharged as finished product and may be stored or directly supplied to the glass melting furnace.

The invention will now be described by an example, it being understood that this example is being given by way of illustration and not by way of limitation and that many changes may be effected without affecting in any way the scope and spirit of the invention as recited in the appended claims.

EXAMPLE

This example was carried out pursuant to the procedure diagramatically indicated in the flow sheet of FIG. 1. By means of a screw conveyor, sand, in an amount of 723 kg/hour was conveyed from receptacle 1 and through the dosage device 2 to a mixer which is not shown in the flow sheet of FIG. 1. The sand had a grain size of between 0.1 and 0.45 mm. By means of a pump 5 (see the dosage unit 5 in FIG. 1) having an output of 370.9 kg/hour, sodium hydroxide solution of 50 percent concentration was conveyed from the storage vessel 4 to the mixer referred to. A control device in the conduit carrying the sodium hydroxide solution controlled the density of the solution and thus fluctuations in the concentration. The sand and the sodium hydroxide solution were homogeneously mixed in the mixer referred to and the mixture thus obtained was then supplied to the reaction zone 3 which was in the form of a reactor. The reactor was of heat regulating nature and the temperature in the reactor was maintained at 380°C. This reactor temperature was obtained by indirect heating with flue gases emanating from the glass melting point. The reaction between the sand and the sodium hydroxide solution in the reactor 3 was maintained for 15 to 20 minutes. This resulted in the liberation of steam which escaped from the reactor through a cyclone in which entrained dust particles were separated. 227.1 kg/hour of water evaporated during the treatment time in the reactor 3. A solid product was obtained in the reactor 3 whose largest particle diameter amounted to not more than 0.2 to 0.45 mm. The reaction product contained only insignificant amounts of sodium hydroxide but large amounts of sodium metasilicate and sodium disilicate. The amount of sodium disilicate was about 30 to 40 percent of the total weight amount of the product discharged from the reactor 3. The product from the reactor 3 was transferred into the heat insulated storage container 6 of FIG. 1.

An intensive action mixer, corresponding to the mixer 8 of FIG. 1, was then supplied with 867 kg of the reaction mixture contained in storage container 6, 85.4 kg of limestone meal, 71 kg of dolomite, 10.8 kg of calcium sulfate as well as dyestuff oxides for the production of green glass and also refining agents (a total of 46.3 kg). These ingredients were supplied to the intensive action mixer through the indicated dosage devices of FIG. 1. The mixer was also supplied with 44.87 kg of water. The mass assumed in the intensive action mixer a plastic and homogeneous consistency. A portion of the water evaporated from the mixer. After a mixing period of 60 seconds, the mass had a grain-like structure, the average diameter of the grains or particles however not being large enough and only being about 1.5 to 2 mm. The temperature of the mixture upon discharge from the intensive action mixer was about 50°C. The mixture discharged from the water was accommodated in a storage container 13 and from there continuously supplied to a granulation pan in an amount of 1,125.3 kg/hour. At the same time water was supplied to the granulating pan through a dosage pump in an amount of 60.5 kg/hour. Spherically-shaped granules (pellets) of uniform diameter were continuously discharged from the granulating pan. The diameter of the pellets could be optionally adjusted within a range of about 5 to 20 mm. This was accomplished by suitably adjusting or varying the speed of revolution and the inclination of the granulating pan and/or the amount of water which was added. The moisture content of the pellets which were discharged from the granulating pan was between about 7 and 10 percent. The pellets were directly supplied from the granulating pan to a drum drier where the pellets were heated to 150° to 200°C. The temperature in the drum drier was obtained by means of flue gases from the glass melting furnace. 1,080 kg/hour of dry pellets were withdrawn from the drum drier. The pellets were mechanically stable and, without breakage or wear could be conveyed to storage silos. The pellets were non-hygroscopic. Melting of the pellets showed an annealing loss of only about 7 percent.

The pellets were analyzed for their chemical composition and for this purpose samples were taken at time intervals of several hours. The analysis results indicated an extremely uniform composition of the granulated pellets which conformed very favorably to the theoretical values corresponding to the original ingredients employed.

| Components | | Analysis Theoretical Composition | Composition of Pellets 1 | Composition of Pellets 2 |
|---|---|---|---|---|
| $SiO_2$ | % | 64.17 | 64.10 | 64.20 |
| $Al_2O_3$ | % | 2.90 | 2.80 | 2.85 |
| CaO | % | 8.78 | 8.70 | 8.80 |
| MgO | % | 1.72 | 1.60 | 1.80 |
| $Na_2O+K_2O$ | % | 13.83 | 13.80 | 13.90 |
| Annealing | loss | 8.60 | 9.00 | 8.45 |
| Total | | 100.00 | 100.00 | 100.00 |

The pellets were used for the purpose of producing green glass. The production was effected in a melting vessel of 70 m² of melting surface. A daily melting output of 205.8 tons was obtained which corresponds to 2.94 tons/m²/day. With customary prior art glass-producing mixtures, while using the same melting container only a maximum daily output of 147 tons, corresponding to 2.1 ton/m²/day could be obtained.

While specific embodiments of the invention have been shown and described in detail to illustrate the application of the inventive principles, it will be understood that the inventive may be embodied otherwise without departing from such principles.

What is claimed is:

1. In a method of forming discrete pieces or pellets from a glass-producing meltable mixture, wherein the glass-producing mixture comprises sand grains and a sodium-containing component which at least partially consists of aqueous sodium hydroxide, the improvement which comprises that the sand grains are reacted at a temperature between about 200° to 450°C for from about 5 minutes to 2 hours with the aqueous sodium hydroxide without direct contact with $CO_2$, thereby to form a surface layer of water soluble silicates on the sand grains, thereafter subjecting the sand grains to a mechanical treatment in order to at least partially remove the water soluble silicates from the sand grains and thereby reducing the size of the sand grains, adding the remaining ingredients of the glass-producing mixture to the sand grains and the water soluble silicates, mixing the mixture to form a uniform mass and then agglomerating the mass in the presence of 5–15 percent by weight of water, the final pellets being non-hygroscopic and constituting an eutectic mixture and possessing good stability on prolonged storage.

2. The temperature of claim 1 wherein the agglomeration is effected in a mixing granulator.

3. The improvement of claim 1 wherein said mechanical treatment is effected prior to adding the remaining ingredients of the glass-producing mixture.

4. The improvement as claimed in claim 1 wherein said water soluble silicates are removed from the sand grains when the mixture is mixed to form a uniform mass in an intensive action mixer.

5. The improvement as claimed in claim 1 wherein said sodium-containing component also contains sodium carbonate.

6. The improvement as claimed in claim 1 wherein said glass-producing mixture also comprises a calcium-containing component, said calcium-containing component at least partially consisting of quicklime.

7. The improvement as claimed in claim 1 wherein said sand grains are reacted with said aqueous sodium hydroxide at a temperature of about between 350° to 400°C and for a period of about between 5 to 60 minutes.

8. The improvement as claimed in claim 1 wherein said sand grains are preheated to said elevated temperature before the sand grains are admixed with the aqueous sodium hydroxide.

9. The improvement as claimed in claim 8 wherein said preheating of the sand to said elevated temperature is effected by heating the sand grains with the flue gases from a glass-producing plant.

10. The improvement as claimed in claim 1 wherein said sand grains, prior to the admixture of said aqueous sodium hydroxide are heated to a temperature of between about 600° to 900°C whereafter said aqueous sodium hydroxide is added to the heated sand grains.

11. The improvement as claimed in claim 1 wherein said aqueous sodium hydroxide has a concentration of about between 30 to 75 percent.

12. The improvement as claimed in claim 1 wherein said aqueous sodium hydroxide has a concentration of about 50 percent.

13. The improvement as claimed in claim 1 wherein said method is carried out in batchwise manner and a portion of the reaction product of said sand grains and said aqueous sodium hydroxide obtained in a batch is recycled to a subsequent batch of sand and aqueous sodium hydroxide.

14. The improvement as claimed in claim 13 wherein the amount of said recycled portion is about between 20 to 70 percent by weight of the total amount of reaction product.

15. The improvement as claimed in claim 13 wherein the amount of said recycled portion is such that said subsequent batch absorbs the total amount of aqueous sodium hydroxide which is required for the desired ultimate composition of the glass-producing mixture to be obtained without the occurrence of sedimentation of the solid ingredients of the mixture.

16. The improvement as claimed in claim 15 wherein said amount is about 5 to 25 percent by weight.

17. The improvement as claimed in claim 1 wherein the method is carried out in batchwise manner and wherein a portion of the reaction product obtained by the reaction of the sand grains with the aqueous sodium hydroxide of a batch and after at least partial mechanical removal of said water soluble silicates from the sand grains is recycled to a subsequent batch of sand and aqueous sodium hydroxide.

18. The improvement as claimed in claim 1 wherein said glass-producing mixture additionally contains a calcium-containing component, said calcium-containing component comprising quicklime and calcium carbonate.

19. The improvement as claimed in claim 1 wherein an aluminum-containing component is added to the reaction between said sand grains and said aqueous sodium hydroxide.

20. The improvement as claimed in claim 19 wherein said aluminum-containing component is alumina.

21. The improvement as claimed in claim 1 wherein, prior to agglomerating said mass, the mass is mixed in an intensive action mixer having a mixing energy output of above 3 kW/100 kg of the mixture.

22. The improvement as claimed in claim 21 wherein said intensive action mixer has a mixing energy output of about 5 to 15 kW/100 kg of the mixture.

23. The improvement as claimed in claim 21 wherein said intensive action mixer is a counter flow mixer.

24. The improvement as claimed in claim 21 wherein the mixture after mixing in said intensive action mixer is agglomerated in the same mixer.

25. The improvement as claimed in claim 1 wherein the mixing of the mixture to form a uniform mass is effected while utilizing the heat of the reaction mixture obtained by the reaction of said sand grains with the aqueous sodium hydroxide.

26. The improvement as claimed in claim 1 wherein said pieces or pellets obtained upon the agglomeration are dried to a water content of not more than 5 percent by weight.

27. The improvement as claimed in claim 6 wherein the agglomeration is carried out in an intensive action mixer by utilizing the heat which has been evolved due to the reaction of said quicklime with the water contained in the system.

28. The improvement as claimed in claim 1 wherein said agglomeration is carried out in the presence of steam supplied to the agglomerating unit.

* * * * *